United States Patent
Esmersoy

(10) Patent No.: US 7,782,709 B2
(45) Date of Patent: Aug. 24, 2010

(54) MULTI-PHYSICS INVERSION PROCESSING TO PREDICT PORE PRESSURE AHEAD OF THE DRILL BIT

(75) Inventor: Cengiz Esmersoy, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 279 days.

(21) Appl. No.: 11/695,730

(22) Filed: Apr. 3, 2007

(65) Prior Publication Data

US 2007/0285274 A1 Dec. 13, 2007

Related U.S. Application Data

(63) Continuation-in-part of application No. 10/604,878, filed on Aug. 22, 2003.

(51) Int. Cl.
*G01V 1/24* (2006.01)

(52) U.S. Cl. .................... 367/31; 367/25; 367/32; 324/323

(58) Field of Classification Search ............ 367/25, 367/31, 32, 57; 324/323
See application file for complete search history.

(56) References Cited

U.S. PATENT DOCUMENTS

| | | | |
|---|---|---|---|
| 4,894,807 A | 1/1990 | Alam et al. | |
| 5,712,829 A | 1/1998 | Tang et al. | |
| 5,841,280 A | 11/1998 | Yu et al. | |
| 5,870,690 A | 2/1999 | Frenkel et al. | |
| 6,201,765 B1 | 3/2001 | Ireson | |
| 6,411,902 B1 * | 6/2002 | Wiltshire | 702/7 |
| 6,462,549 B1 * | 10/2002 | Curtis et al. | 324/323 |
| 6,473,696 B1 * | 10/2002 | Onyia et al. | 702/6 |
| 6,609,067 B2 * | 8/2003 | Tare et al. | 702/9 |
| 6,751,558 B2 * | 6/2004 | Huffman et al. | 702/14 |
| 6,814,142 B2 * | 11/2004 | Paulk et al. | 166/250.07 |
| 6,819,110 B2 | 11/2004 | Omeragic et al. | |
| 6,826,486 B1 | 11/2004 | Malinverno | |
| 6,832,158 B2 * | 12/2004 | Mese et al. | 702/9 |
| 6,977,866 B2 * | 12/2005 | Huffman et al. | 367/73 |
| 7,310,580 B2 | 12/2007 | Zhou et al. | |
| 2004/0244972 A1 | 12/2004 | Sayers et al. | |
| 2005/0041526 A1 | 2/2005 | Esmersoy et al. | |
| 2005/0150713 A1 | 7/2005 | Garcia-Osuna et al. | |
| 2005/0152219 A1 | 7/2005 | Garcia-Osuna et al. | |

(Continued)

FOREIGN PATENT DOCUMENTS

EP 1680692 7/2006

(Continued)

OTHER PUBLICATIONS

Hoversten, et al. "Pressure and fluid saturation prediction in a multicomponent reservoir using combined seismic and electromagnetic imaging." Geophysics, vol. 68., No. 5 (Sep.-Oct. 2003).*

(Continued)

*Primary Examiner*—Scott A Hughes
(74) *Attorney, Agent, or Firm*—Kevin McEnaney; Darla Fonseca; Brigitle Echols

(57) ABSTRACT

Methods are disclosed to predict pore pressure ahead of the drill bit while drilling a borehole through subsurface regions.

39 Claims, 11 Drawing Sheets

U.S. PATENT DOCUMENTS

2007/0127314 A1    6/2007    Wang et al.

FOREIGN PATENT DOCUMENTS

WO  PCT/GB2004/001144    9/2004
WO       2005040860 A1    5/2005

OTHER PUBLICATIONS

J.C. Rasmus, "Real-Time Pore-Pressure Evaluation From MWD/LWD Measurements and Drilling-Derived Formation Strength," SPE Drilling Engineering, Dec. 1991, 18 pages.
Ellingsrud et al., "Remote Sensing of Hydrocarbon Layers by Seabed Logging (SBL): Results from a Cruise Offshore Angola," The Leading Edge, Oct. 2002, 6 pages.
Constable et al., "Mapping Thin Resistors and Hydrocarbons with Marine EM Methods: Insights from 1D Modeling," Geophysics, vol. 71, No. 2 (Mar.-Apr. 2006), 9 pages.
Stephen Constable, "Marine Electromagnetic Methods—A New Tool for Offshore Exploration," The Leading Edge, Apr. 2006, 5 pages.
Key et al., "Mapping 3D Salt Using the 2D Marine Magnetotelluric Method: Case Study from Gemini Prospect, Gulf of Mexico," Geophysics, vol. 71, No. 1 (Jan.-Feb. 2006), 11 pages.
Barriol et al., "The Pressures of Drilling and Production," Oilfield Review, Autumn 2005, 20 pages.
Schlumberger, "sonicVision," 6 pages.
Schlumberger, "MDT Modular Formation Dynamics Tester," Jun. 2002, 11 pages.
Schlumberger, "adnVision," Aug. 18, 2006, 2 pages.
Schlumberger, "E-Pulse," Sep. 7, 2006, 1 page.
Schlumberger, "Overburden" "Geology," Aug. 18, 2006, 1 page.
Schlumberger, "Filter Cake," Aug. 11, 2006, 1 page.
Schlumberger, "Hydrostatic Pressure," "Drilling," and "Drilling Fluids," Aug. 7, 2006, 1 page.
Schlumberger, "Pressure Versus Depth Plot," Aug. 7, 2006, 1 page.
Schlumberger, "Pore Pressure," Aug. 7, 2006, 1 page.
Stewart, R.R., "Depth Imaging of Reservoirs using Well Logs, VSP, and Surface Seismic Data," ASEG/SEG Conference, Adelaide, 1088.
Lapin, et al., "Joint VSP and Surface Seismic Tomography," SEG 2003.
Graziella, et al., "Integrating Borehole Information and Surface Seismic for Velocity Anisotropy Analysis and Depth Imaging,"The Leading Edge, May 2001.
Haversten et al., "Pressure and Fluid Saturation Prediction in a Multicomponent Reservoir using combined Seismic and Electromagnetic imaging," Geophysics, vol. 68, No. 5 (Sep.-Oct. 2003).

* cited by examiner

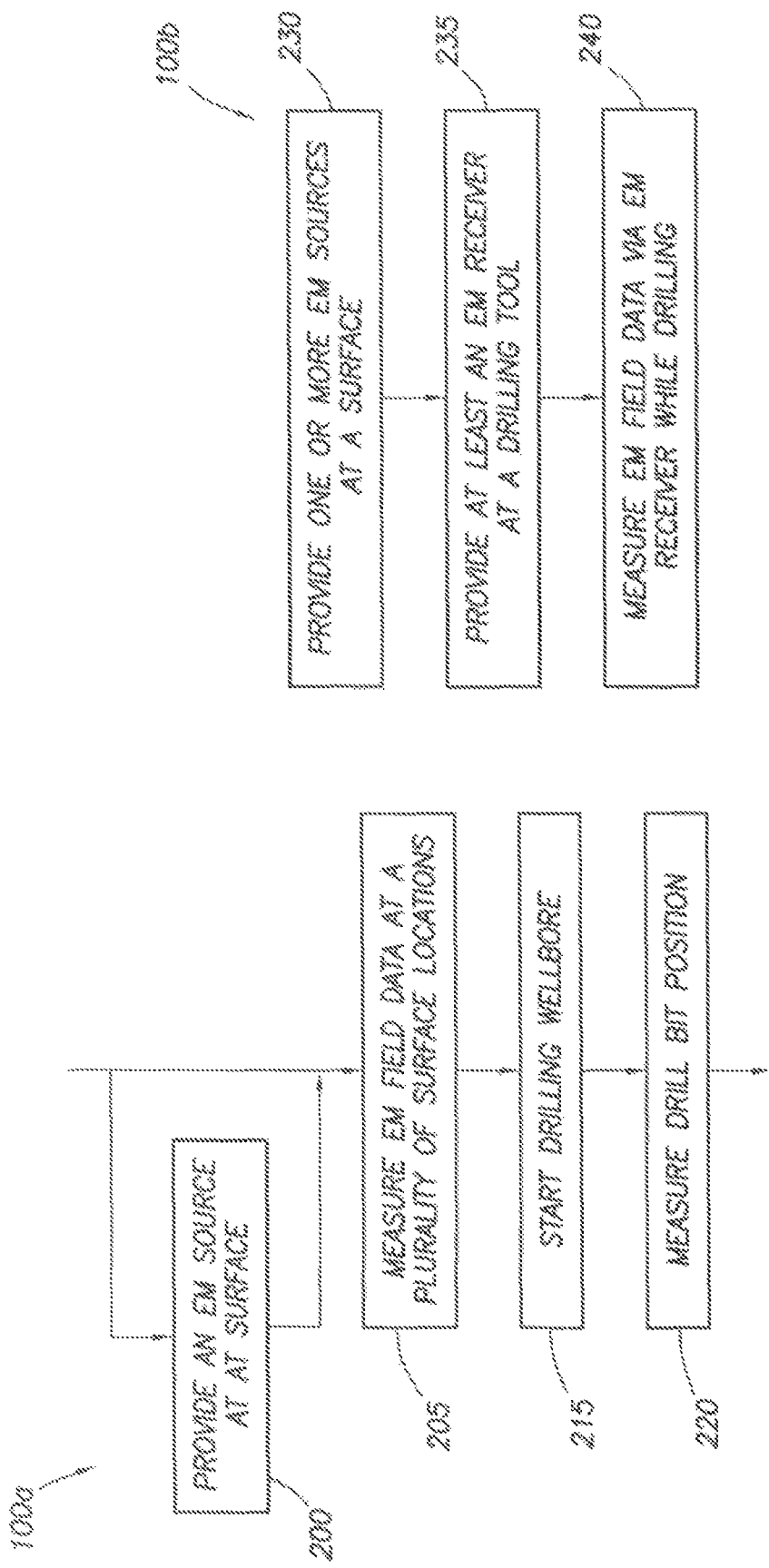

MULTI-PHYSICS INVERSION PROCESSING TO PREDICT PORE PRESSURE AHEAD OF THE DRILL BIT

RELATED APPLICATION DATA

This application is a continuation-in-part of U.S. application Ser. No. 10/604,878 filed on Aug. 22, 2003, pending.

FIELD OF THE DISCLOSURE

This disclosure relates generally to subsurface drilling operations and, more particularly, to inversion processing methods to predict pore pressure ahead of the drill bit while drilling a borehole through subsurface regions.

BACKGROUND

A column of drilling fluid, usually referred to as mud, is customarily provided in a borehole while drilling the borehole through subsurface formations. Usually, the weight of the mud is carefully selected such that the hydrostatic pressure in at least an uncased section of the borehole is above the pore pressure and below the fracture pressure in the surrounding subsurface formations or regions. If the hydrostatic pressure is lower than the pore pressure, a kick or blowout may occur. If the hydrostatic pressure is higher than the fracture pressure, a loss of the circulation of the mud in the borehole may occur. Fracture pressure typically increases rapidly with depth so that maintaining the hydrostatic pressure below the fracture pressure after drilling an initial section of the borehole is usually less of a problem. However, pore pressure generally follows a less predictable pattern. If the pore pressure ahead of the drill bit can be predicted, the mud weight needed to provide the desired hydrostatic pressure in the borehole can be determined prior to drilling an interval or distance ahead of current position of the drill bit, which facilitates in the avoidance of drilling hazards.

BRIEF DESCRIPTION OF THE DRAWINGS

FIG. 3A is a representative flow diagram of an example method to measure electro-magnetic (EM) field data.

FIG. 3B is a representative flow diagram of another example method to measure electromagnetic (EM) field data.

DETAILED DESCRIPTION

In general, the example methods described herein to predict pore pressure ahead of a drill bit may be used in various types of drilling operations to reduce the hazards of drilling a borehole. Additionally, while the examples herein are described in connection with drilling operations for the oil and gas industry, the examples described herein may be more generally applicable to a variety of drilling operations for different purposes.

Figure 1:
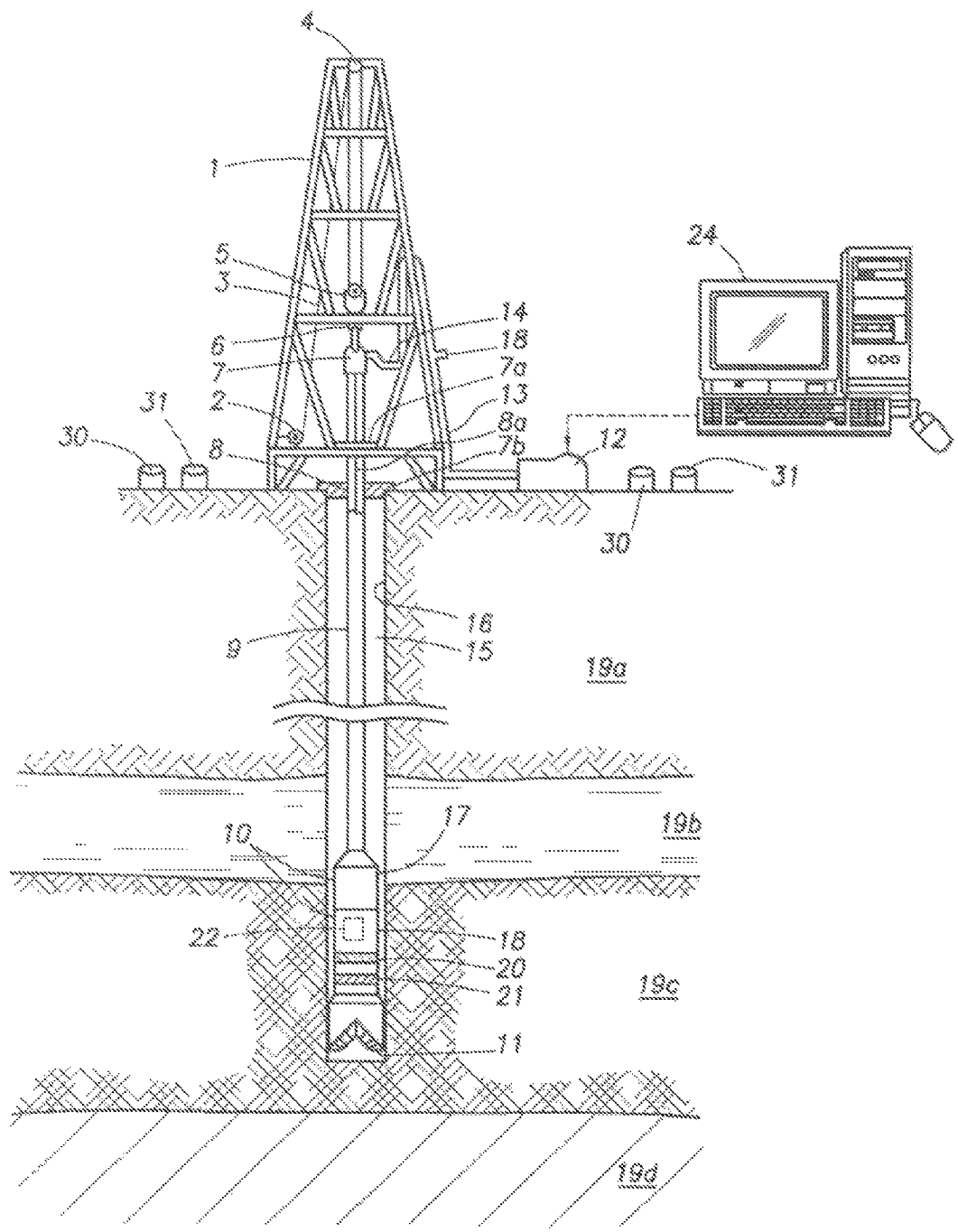
FIG. 1 is an illustration of an example drilling operation including a drilling rig, a drill string including a bottom hole assembly, a data processor, surface sources and surface receivers.

FIG. 1 is an illustration of an example drilling operation including a drilling rig or derrick 1 having a drawworks 2, a cable 3, a crown block 4, a traveling block 5, and a hook 6 supporting a drill string 8. The drill string 8 includes a swivel joint 7, a Kelly 7a, a well head 7b, drill pipe 9, drill collars 10, and a drill bit 11, which may include a bent sub for directional drilling. The drill collars 10 and the drill bit 11 are generally collectively known as a bottom hole assembly (BHA). Mud pumps 12 circulate drilling fluid (e.g., drilling mud) through a mud passage 8a in the drill pipe 9 and the drill collars 10 to a mud motor (not shown) to operate the drill bit 11, and back to the surface through an annular space 15 between the drill string 8 and the borehole wall 16. A data processing system 24 is illustrated as connected to the mud pumps 12 to receive or send telemetry signals to the BHA via a mud telemetry system. Typically, the data processing system 24 may perform a variety of functions such as, for example, recording driller depth, processing information from one or more tools in the drill collars 10 to locate the position of the drill bit 11, providing a reservoir model generated from measurements obtained before drilling, etc., and may be located proximate to or remote from the site of the drilling rig 1. As an alternative to a mud telemetry system, a wired drill pipe (WDP) can be utilized to transmit sensed data to the surface. The WDP typically includes wires and couplers built into the drill pipe 9 and has a high bandwidth signal, which can easily convey signals communicated via electrical connections to the data processing system 24.

The drill collars 10 include a measurement while drilling tool 17 and a logging while drilling tool 18. The operation of instruments such as wired drill pipe, acoustic telemetry instruments, accelerometers, magnetometers, and pressure sensors during drilling is commonly referred to as measurement while drilling (MWD), Determining the characteristics of subsurface regions while drilling is commonly called logging while drilling (LWD) and, typically, is performed by tools that measure characteristics of acoustic waves, seismic waves, resistivity, and gravitational forces.

The MWD tool 17 may enable a variety of functions by containing various tools such as, for example, power generation for instruments in the BHA (e.g., turbine powered by mud circulation), telemetry between tools in the BHA and instruments at the surface (e.g., wired drill pipe, acoustic telemetry, etc.), determining the position of the BHA (e.g., accelerometers, magnetometers, etc.), and downhole pressure measurement (e.g., pressure sensors). The LWD tool 18 may enable a variety of functions to determine the characteristics of subsurface layers, formations or regions such as, for example, subsurface regions 19a-c (see FIG. 1) into or through which the drill string 8 extends, and a subsurface region 19d below or ahead of the drill bit 11. Typically, the LWD tool 18 may include instruments such as, for example, one or more downhole transmitters 20 (e.g., electric coils, acoustic sources, etc.), one or more downhole sensors 21 (e.g., electric coils, acoustic receivers, etc.), and a controller 22 (e.g., a unit with a memory, central processing unit, and clock) to process and store signals from the sensors 21. As shown in FIG. 1, the data processing system 24 receives data from the MWD tool 17 and/or the LWD tool 18 via the mud telemetry system.

One or more sources 30 and/or receivers 31 are located proximate the site of the rig 1 or, alternatively, may be located a distance from the rig 1. Also, a source 20 and/or a receiver 21 may be attached to the BHA and lowered into the well bore to provide a downhole source and/or receiver during drilling. As is known in the art, the source 30 or the receiver 31 may be an electric dipole antenna to generate an electrical field, or an induction coil to generate a magnetic field, or an electroseismic source or receiver, Typically, the orientation of the generated electric dipole or the magnetic field is pre-selected and several field components may be excited or recorded. Usually, the electrical pulses used to operate the antenna or induction coil are in the frequency range of 0.1 Hz to 1 KHz. Alternatively, the source 30 or the receiver 31 may include more than one source unit or receiver unit so that the delay of electrical pulses can achieve directionality patterns. As is known, electroseismic sources or receivers use seismic waves that produce an electric field (or vice versa) in subsurface formations.

Although FIG. 1 illustrates a land-based rig 1, typically off-shore drilling operations include much of the same equipment and tools as illustrated in FIG. 1. For example, the source 30 can be located at a subsurface level for an off shore drilling operation (e.g., a boat-supported cable with a sensor), and the wellhead 7b may be located at the bottom of the sea below an offshore rig.

Figure 2:
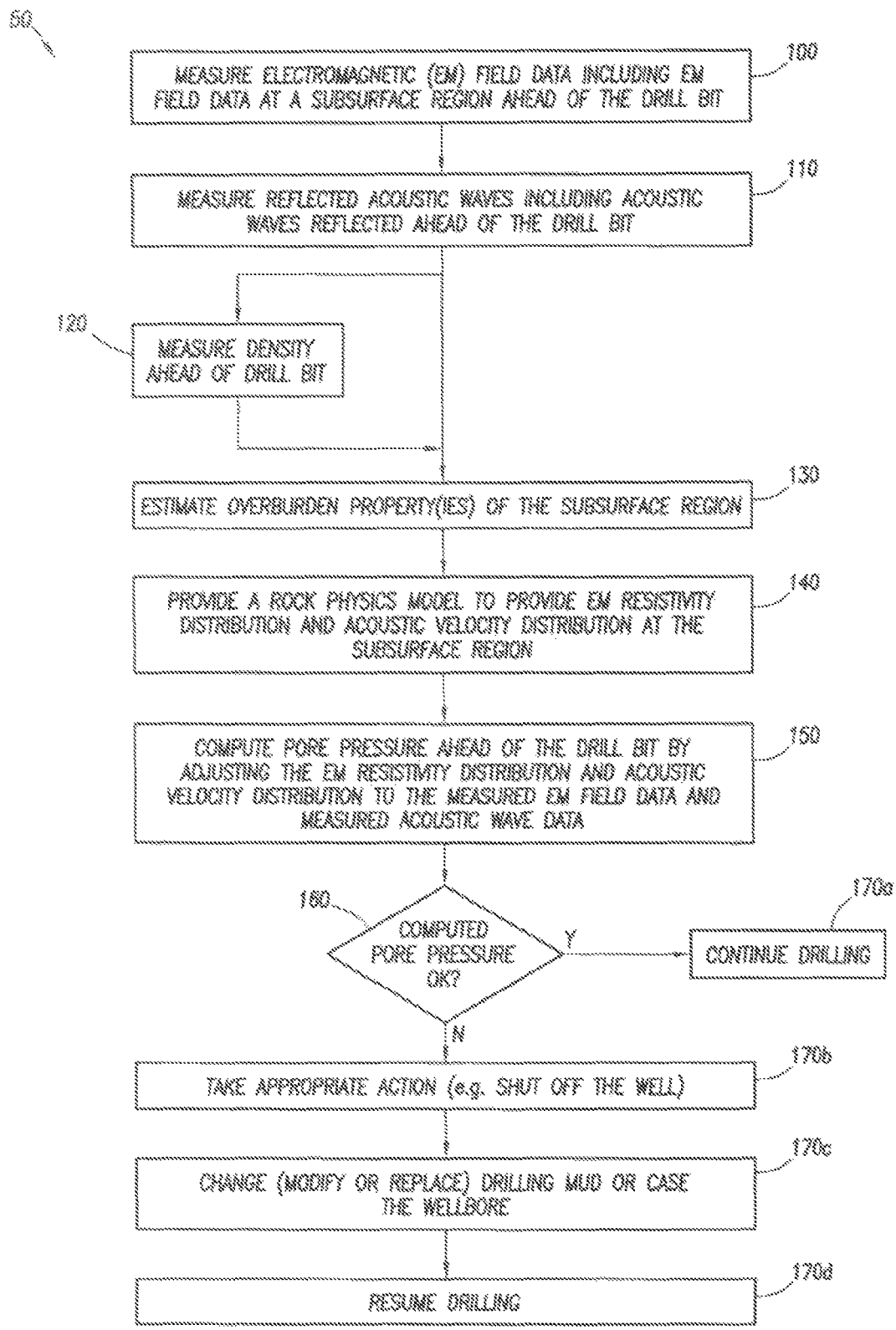
FIG. 2 is a representative flow diagram of an example method to predict pore pressure ahead of a drill bit.

FIG. 2 is a representative flow diagram of an example method 50 that may be used to predict pore pressure ahead of the drill bit 11 in a subsurface region such as, for example, the subsurface region 19d in FIG. 1. Initially, at block 100, a LWD tool such as, for example, the LWD tool 18 in FIG. 1 may be used to measure electromagnetic (EM) field data including EM field data at the subsurface region 19d. The LWD tool 18 may include an EM resistivity logging instrument to perform the methods disclosed in commonly owned U.S. Pat. No. 6,819,110, which is incorporated by reference in its entirety herein. The EM field data may include EM resistivity distribution data. Several techniques or methods may be used to measure EM field data, including those disclosed below and described in more detail in FIGS. 3A-D.

Next at block 110, the LWD tool 18 in FIG. 1 may be used to measure reflected acoustic waves including acoustic waves reflected ahead of the drill bit 11 at the subsurface region 19d. Apparatus and methods such as those disclosed in commonly owned US 2005/0041526, which is incorporated by reference in its entirety herein, may be used. Several further techniques or methods may be used to measure reflected acoustic waves, including those disclosed below in more detail in FIGS. 4A-D.

The example method 50 includes, as an option, using the MWD tool 17 to obtain data to estimate the density of the subsurface region 19d, (block 120). An estimation of the density of the subsurface region 19d may be accomplished by using known gravimetry tools such as, for example, a precise accelerometer having a quartz spring and a mass, to obtain data from which the density of the subsurface region 19d may be determined by known relationships.

At block 130, an estimate of the overburden properties, including overburden stress or overburden stress distribution, of the subsurface regions 19a-c in FIG. 1 is obtained. Overburden stress may be defined as the weight of the rock and fluid overlying a point of interest in the subsurface such as, for example, the weight of the subsurface regions 19a-c overlying a point of interest in the subsurface region 19d in FIG. 1. As described above, the LWD tool 18 may be used to: (1) accumulate density data for the subsurface regions 19a-c, and the overburden stress distribution may be determined from a known relationship between density and stress, (2) estimate overburden stress using prior knowledge of the geology, or (3) collect data at an offset well (typically gathered from wireline tools). Alternatively, data having a relationship or equivalence to overburden stress may be utilized as the data for the block 130 in the example method 50. For example, a resistivity gradient may be derived from a resistivity trend in a series of resistivity values obtained from such as, for example, known data or the LWD tool 18. In a similar manner, a velocity gradient may be derived from a velocity trend in a series of velocity values obtained from, for example, known data or the LWD tool 18.

A rock physics model is provided at block 140. The rock physics model is a relationship or correlation between subsurface layer characteristics such as, for example, pore pressure, estimated overburden stress or related data, EM resistivity field data, acoustic wave velocity data, and/or density data. Selected characteristics or parameters may be used as inputs to the rock physics model correlation and, in a similar manner, outputs may be selected for the rock physics model. The example method 50 uses the characteristics of pore pressure and estimated overburden stress as inputs to the rock physics model and uses as outputs an EM resistivity distribution and an acoustic velocity distribution at the subsurface region. The rock physics model of block 140 may be created by using different example tools, which are disclosed in greater detail in FIGS. 5A and 5B.

At block 150 in FIG. 2, the pore pressure ahead of the drill bit (e.g., the pore pressure at the subsurface region 19d in FIG. 1) is computed using inversion processing techniques. The inversion processing techniques include the EM resistivity distribution and the acoustic velocity distribution both being adjusted, using a pore pressure estimate, to the measured EM field data and the measured acoustic wave data obtained in blocks 100 and 110, respectively. More particularly, inversion processing uses an initial pore pressure estimate and forward modeling, by methods well known in the art, of the EM resistivity distribution and the acoustic velocity distribution to predict EM field data and acoustic wave data, and then determines the difference between the predicted EM field data and predicted acoustic wave data and the respective measured EM field data and measured acoustic wave data. The pore pressure estimate is then adjusted and the EM field data and acoustic wave data are again predicted and compared, and this process is repeated until at least one of the predicted EM field data or acoustic wave data substantially equals the respective measured EM field data or the measured acoustic wave data, and thereby provides the pore pressure of the subsurface region 19d ahead of the drill bit 11. Example inversion processing techniques are disclosed in FIGS. 7 A and B and are discussed in more detail below.

As disclosed above for block 150 in FIG. 2, the pore pressure ahead of the drill bit is computed by the joint inversion processing of the EM resistivity distribution and the acoustic velocity distribution. Alternatively, the inversion processing techniques may include only one of the EM resistivity distribution or the acoustic velocity distribution being adjusted, using a pore pressure estimate, to a respective measured EM field data or the measured acoustic wave data obtained in blocks 100 and 110. More particularly, the inversion processing may use an initial pore pressure estimate and forward modeling, by methods well known in the art, of either the EM resistivity distribution or the acoustic velocity distribution to predict respectively EM field data or acoustic wave data, and then determine the difference between either the predicted EM field data and the measured EM field data or the predicted acoustic wave data and the measured acoustic wave data. The pore pressure estimate is then adjusted and either the EM field data or acoustic wave data are again predicted and compared, and this process is repeated until either the predicted EM field data or the predicted acoustic wave data substantially equals the respective measured EM field data or the measured acoustic wave data, and thereby provide the pore pressure of the subsurface region 19d ahead of the drill bit 11. The example inversion processing technique disclosed in FIG. 7 A may use of just one of the measured EM field data or the measured acoustic wave data, and is discussed in more detail below.

Referring again to FIG. 2, the example method 50 may include, as an option at block 160, the computed pore pressure at the subsurface region being compared to the hydrostatic or borehole pressure as measured by instruments in the BHA. The comparison is used to determine if the drilling operation should be changed. If the computed pore pressure is less than the hydrostatic pressure, then drilling may be continued, as shown in block 170a. If the computed pore pressure is greater than the hydrostatic pressure, then drilling may be suspended to take appropriate action such as, for example, shutting off the well, (block 170b). Thus, the computed pore pressure at the subsurface region may provide a basis for the early detection of a kick or blowout before it happens. Additionally, sensors or detection equipment may be used to detect a flow of formation or subsurface layer fluid into the well bore. After the drilling has been suspended, at block 170c the drilling mud or fluid being circulated in the well bore may be changed (e.g., either modified or replaced) to offset the higher pore pressure or, alternatively, the well bore may be cased to prevent fracturing the rock with increased mud weight. The change of the mud can include increasing the mud weight. Then, drilling of the well may be resumed, (block 170d).

FIGS. 3A-D are representative flow diagrams of example methods 100a-d to measure the EM field data at block 100 of FIG. 2. An example surface survey method or process 100a of FIG. 3A includes as an initial option at block 200, an EM source such as, for example, the source 30 illustrated in FIG. 1, being provided at a surface. The source 30 may be used to provide a controlled-source EM survey. For an off-shore drilling operation, the source 30 may be towed by a ship and located at a surface below the sea level. If an EM source 30 is not used, then a magneto-telluric survey may be conducted by using magneto-telluric instrumentation to estimate resistivity of the subsurface formations. At block 205, EM field data is measured at more than one surface location by utilizing known sensor or receiver instruments such as, for example, one or more of the receivers 31 in FIG. 1. The receivers 31 may be used to measure induced, reflected or refracted EM waves to obtain EM field data from a plurality of surface locations including a surface below the sea level for off-shore drilling operations.

The drilling of the well may commence as shown in block 215. During the drilling operation, the MWD tool 17 may be used to obtain inclination and azimuth data throughout the depth of the well bore (e.g., throughout the driller depth) to provide the position of a drill tool such as, for example, the drill bit 11 in FIG. 1, (block 220). The example surface survey process 100a in FIG. 3A may used to measure the EM field data disclosed in block 100 of the example method 50 in FIG. 1.

FIG. 3B discloses an example surface-to-borehole measurement process 100b. At block 230, one or more EM sources such as, for example, the source 30 illustrated in FIG. 1 and described herein) may be provided at a surface. As disclosed above, the EM source 30 may be used to provide a controlled-source EM survey. For an off-shore drilling operation, the EM source 30 maybe located at a surface below the sea level. At block 235, an EM receiver such as, for example, the sensor or receiver 21 in FIG. 1 may be located proximate the drilling tool or drill bit 11. The EM receiver 21 measures induced, reflected or refracted EM waves to obtain EM field data during drilling operations, as illustrated at block 240. The example surface-to-borehole measurement process 100b in FIG. 3B may used to measure the EM field data disclosed in block 100 of the example method 50 in FIG. 1.

Figure 3D:
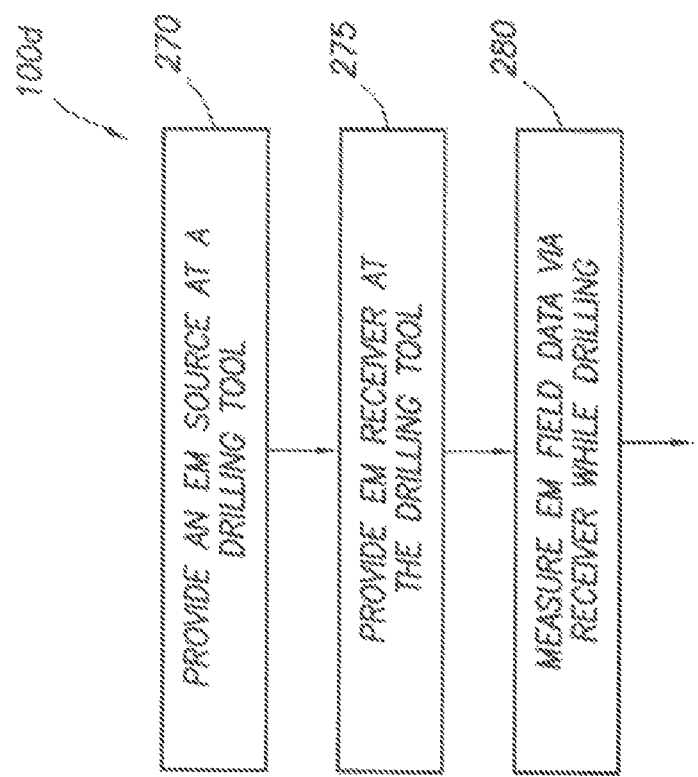
FIG. 3D is a representative flow diagram of yet another example method to measure electro-magnetic (EM) field data.
Figure 3C:
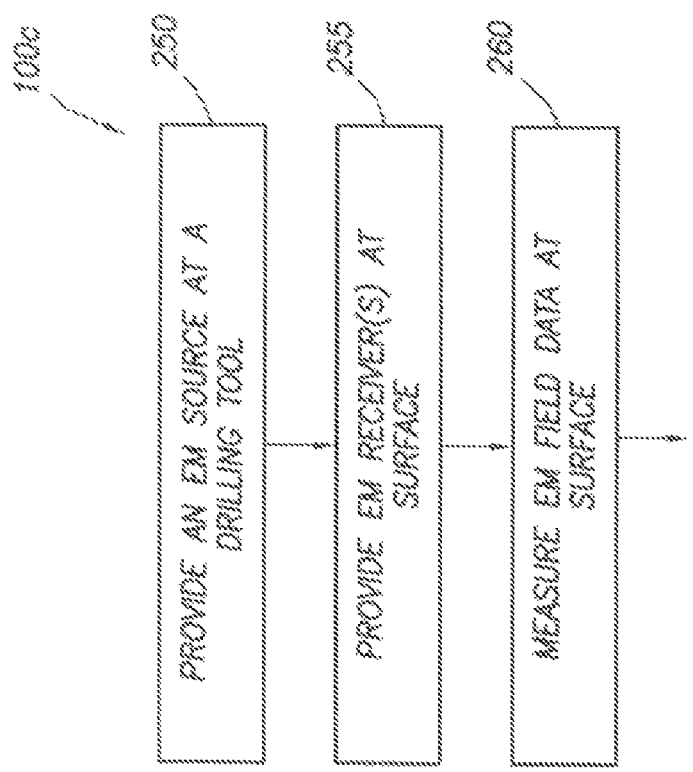
FIG. 3C is a representative flow diagram of another example method to measure electro-magnetic (EM) field data.

An example downhole-to-surface measurement process 100c is disclosed in FIG. 3C. At block 250, an EM source such as, for example, the source or transmitter 20 of the LWD tool 18 illustrated in FIG. 1, may be provided at the drilling tool or drill bit 11. At block 255, one or more EM receivers such as, for example, the receiver 31 in FIG. 1, may be located at a surface. For off-shore drilling operations, the EM receivers 31 could be located at a surface below the sea level. The receivers 31 measure induced, reflected or refracted EM waves to obtain EM field data during drilling operations, (block 260). The example downhole-to-surface measurement process 100c in FIG. 3C may used to measure the EM field data disclosed in block 100 of the example method 50 in FIG. 1. This can be an EM MWD tool such as, for example, E-Pulse, which transmits EM telemetry data during drilling operations. E-Pulse is provided by Schlumberger Oilfield Services, the assignee of this patent application.

An example downhole measurement process 100d is illustrated in FIG. 3D. An EM source such as, for example, the source or transmitter 20 of the LWD tool 18 illustrated in FIG. 1, may be provided at or proximate the drilling tool or drill bit 11, as depicted at block 270. At block 275, an EM receiver such as, for example, the sensor or receiver 21 in FIG. 1 may be located proximate the drill bit 11. The EM receiver 21 measures induced, reflected or refracted EM waves to obtain EM field data during drilling operations, as shown at block 280. An example of the transmitter 20 and the receiver 21 is an EM resistivity logging instrument that may perform the methods disclosed in U.S. Pat. No. 6,819,110 incorporated by reference herein in its entirety. The example downhole measurement process 100d in FIG. 3D may used to measure the EM field data disclosed in block 100 of the example method 50 in FIG. 1.

Figures 4A, 4B:
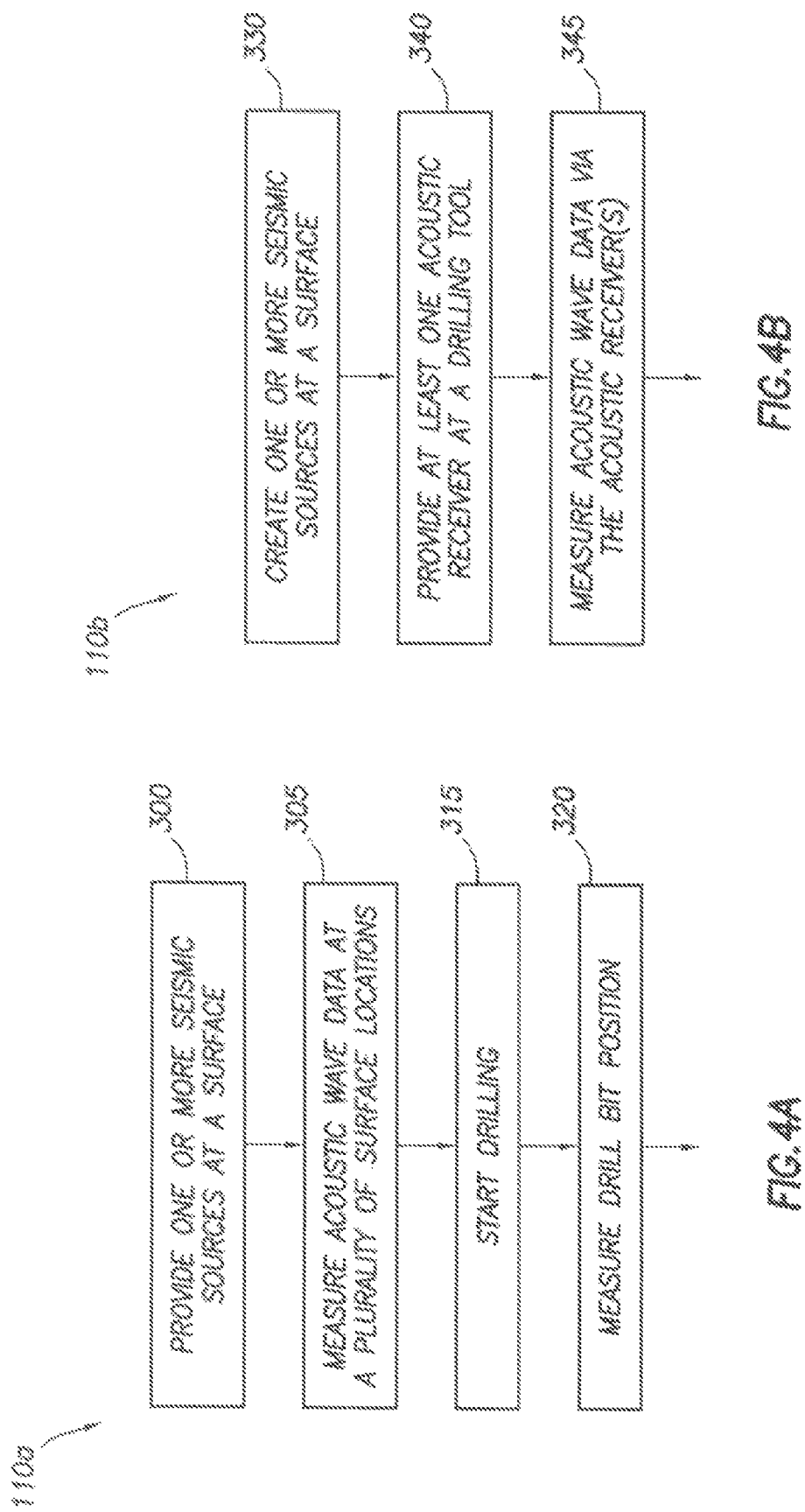
FIG. 4A is a representative flow diagram of an example method to measure reflected acoustic waves.
FIG. 4B is a representative flow diagram of another example method to measure reflected acoustic waves.

FIGS. 4A-D are representative flow diagrams of example methods 10a-d to measure reflected acoustic waves disclosed in block 110 of FIG. 2. An example surface survey method or process 110a is illustrated in FIG. 4A. One or more acoustic sources such as, for example, the source 30 illustrated in FIG. 1, may be provided at a surface, (block 300). The acoustic source 30 may be used to provide seismic waves for a surface survey. On land, explosive charges or a vibrator unit may be used and off-shore, an air gun may be used. At block 305, acoustic wave data is measured at more than one surface location by utilizing known sensor or receiver instruments such as, for example, one or more of the receivers 31 in FIG. 1. Typically, the acoustic receivers 31 may be three-axis geophones for land operations or pressure hydrophones for offshore operations. Also, four component seismic receivers (three axis and pressure) at sea bed level may be used for off-shore operations.

The drilling of the well may commence as shown in block 315. During the drilling operation, the MWD tool 17 may be used to obtain inclination and azimuth data throughout the depth of the well bore (e.g., throughout the driller depth) to provide the position of a drill tool such as, for example, the drill bit 11 in FIG. 1, (block 320). Alternatively, measurement of the location of the drill bit 11 may be accomplished by using a sonic log of the subsurface layers 19a-d in FIG. 1. The sensor 21 of the BHA in FIG. 1 may be an acoustic (e.g., seismic or sonic) receiver to receive signals from the acoustic source 30. The measurement of acoustic wave data may also be accomplished by check shot measurements with a walk away option. The example surface survey process 110a in FIG. 4A may used to measure the reflected acoustic waves disclosed in block 110 of the example process 50 in FIG. 1.

FIG. 4B illustrates another method to measure reflected acoustic waves. At block 330, an example surface-to-borehole measurement method 110b includes at a surface one or more seismic sources such as, for example, the source 30 illustrated in FIG. 1. The acoustic source 30 may be used to provide seismic waves for the measurement method 110b. For an off-shore drilling operation, the acoustic source 30 could be located at a surface below the sea level. At least one acoustic receiver such as, for example, the sensor or receiver 21 in FIG. 1 may be located proximate the drilling tool or drill bit 11, (block 340). As described above for the LWD tool 18 in FIG. 1, the LWD tool 18 may include acoustic receivers 21 to measure acoustic waves and perform the methods disclosed in US 2005/0041526 incorporated by reference herein in its entirety. The one or more acoustic receivers 21 measure reflected acoustic waves to obtain acoustic wave data during drilling operations, (block 345). The example surface-to-borehole measurement method 110b in FIG. 4B may be used to measure the acoustic wave data disclosed in block 110 of the example method 50 in FIG. 1.

Figures 4C, 4D:
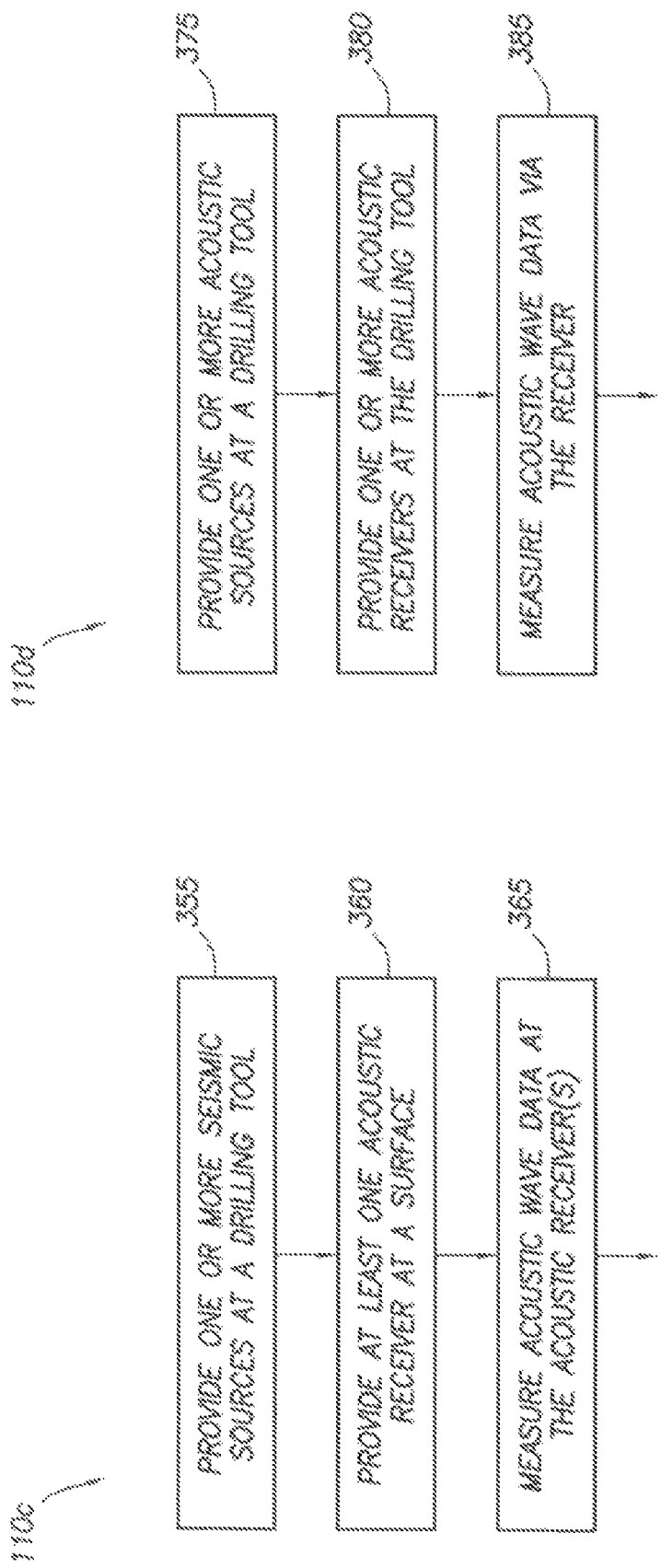
FIG. 4C is a representative flow diagram of yet another example method to measure reflected acoustic waves.
FIG. 4D is a representative flow diagram of another example method to measure reflected acoustic waves.

An example downhole-to-surface measurement process 110c is disclosed in FIG. 4C. At block 355, one or more seismic sources such as, for example, the source or transmitter 20 of the LWD tool 18 illustrated in FIG. 1, may be provided at the drilling tool or drill bit 11. Alternatively, the acoustic source may be the drill bit 11. One or more accelerometers in the BHA may record the vibrations of the drill bit 11 and send data uphole to be correlated with surface receivers. Alternatively, when drilling has ceased in order to connect a stand of pipe to the drill string 8, a controlled acoustic source 20 can be operated. At block 360, one or more acoustic receivers such as, for example, the receivers 31 in FIG. 1, may be located at a surface. For off-shore drilling operations, the acoustic receivers 31 may be located at a surface below the sea level. Typically, the acoustic receivers 31 may be three-axis geophones for land operations or pressure hydrophones for off-shore operations. Also, four component seismic receivers (three axis and pressure) at sea bed level may be used for off-shore operations.

The one or more receivers 31 measure acoustic waves reflected from the interfaces of subsurface layers such as, for example, the subsurface layers or regions 19a-d in FIG. 1, to obtain acoustic wave data during drilling operations, (block 365). The travel times of the acoustic waves may be inverted to provide velocities for the subsurface layers 19a-d. The example downhole-to-surface measurement process 110c in FIG. 4C may used to measure the acoustic wave data disclosed in block 110 of the example method 50 in FIG. 1.

Referring now to FIG. 4D, an example downhole measurement process 110d is disclosed in FIG. 4D. One or more acoustic sources such as, for example, the source or transmitter 20 illustrated in FIG. 1, may be provided at or proximate the drilling tool or drill bit 11, as shown in block 375. Alternatively, the acoustic source can be the drill bit 11. Drill bit 11 noise can be recorded with accelerometers mounted on the BHA and correlated with the signal recorded at a downhole acoustic sensor sensor or receiver 21. At block 380, one or more acoustic receivers such as, for example, the sensor or receiver 21 in FIG. 1 may be located proximate the drill bit 11, at the LWD tool 18. The acoustic source 20 may be located, as illustrated in FIG. 1, above the acoustic sensor or receiver 21 in the LWD tool 18. During drill stand connections when the rotation of the drill string 8 and the circulation of drilling mud has stopped, measurements may be taken wherein the acoustic source 20 emits acoustic waves toward the acoustic receiver 21 and the drill bit 11, (block 385). The receiver 21 detects the downward propagating acoustic waves and also detects waves reflected at an interface boundary between an impermeable subsurface layer and abnormal pore pressure ahead of the drill bit 11 (e.g., the interface boundary between the subsurface layers 19c and 19d in FIG. 1). The example downhole measurement process 110d may use the detected velocity of a downward propagating wave and the difference of the arrival time of the downward propagating wave and the reflected wave to provide the position of the interface boundary. The measurement process 110d may then use the interface boundary position, the amplitude of the downward propagating wave, its attenuation, and the amplitude of the reflected wave to provide the acoustic impedance of the subsurface layer 19d. A velocity of the subsurface layer 19d may then be obtained from the impedance. As described above, the LWD tool 18 may include an acoustic source 20 and an acoustic receiver 21 to provide a logging instrument arrangement similar to those disclosed in U.S. Pat. No. 6,819,110 incorporated by reference herein in its entirety. The example downhole measurement process 11d in FIG. 4D may used to measure the acoustic wave data disclosed in block 110 of the example process 50 in FIG. 1.

Figure 5A:
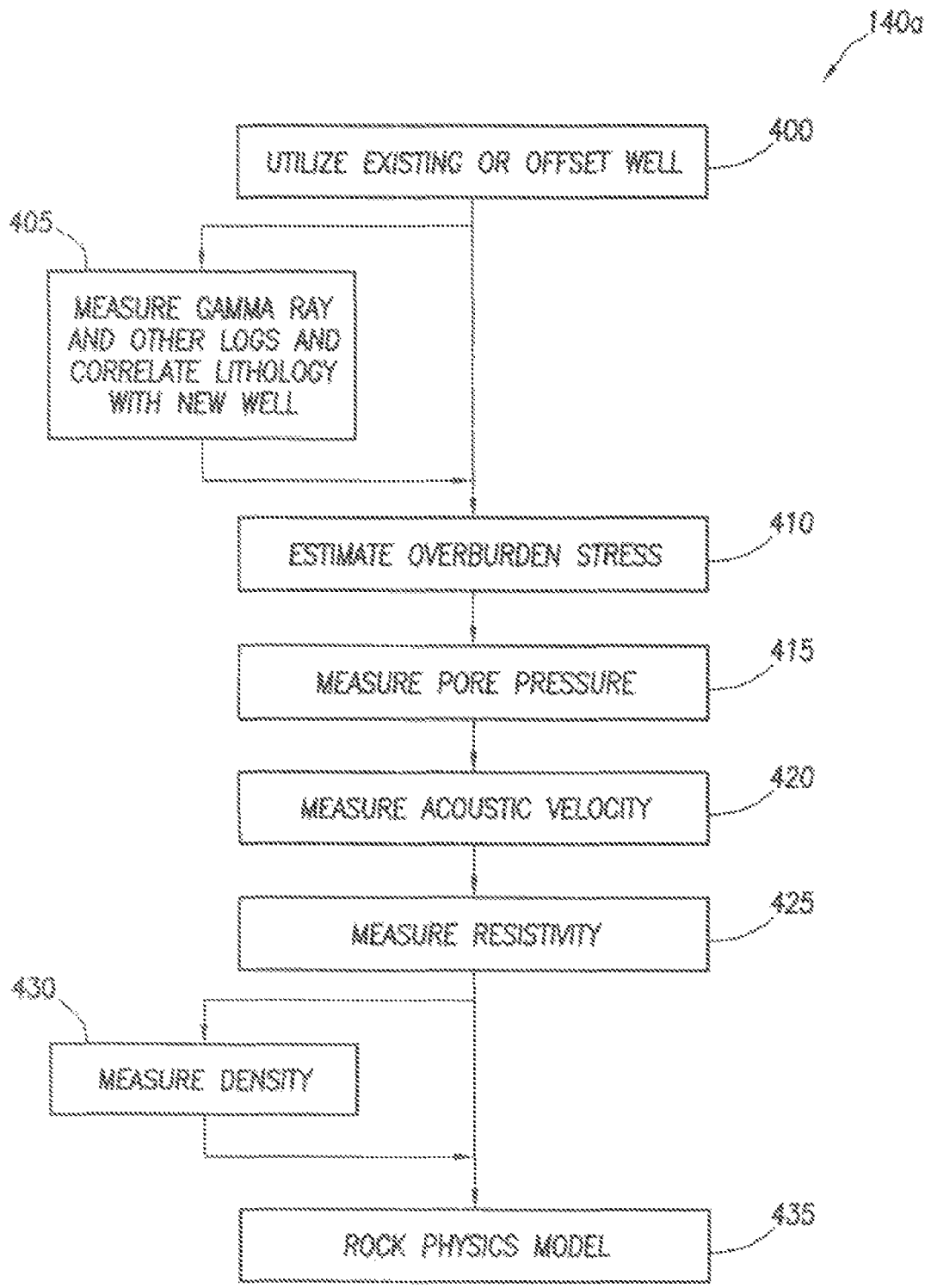
FIG. 5A is a representative flow diagram of an example method to provide a rock physics model.
Figure 5B:
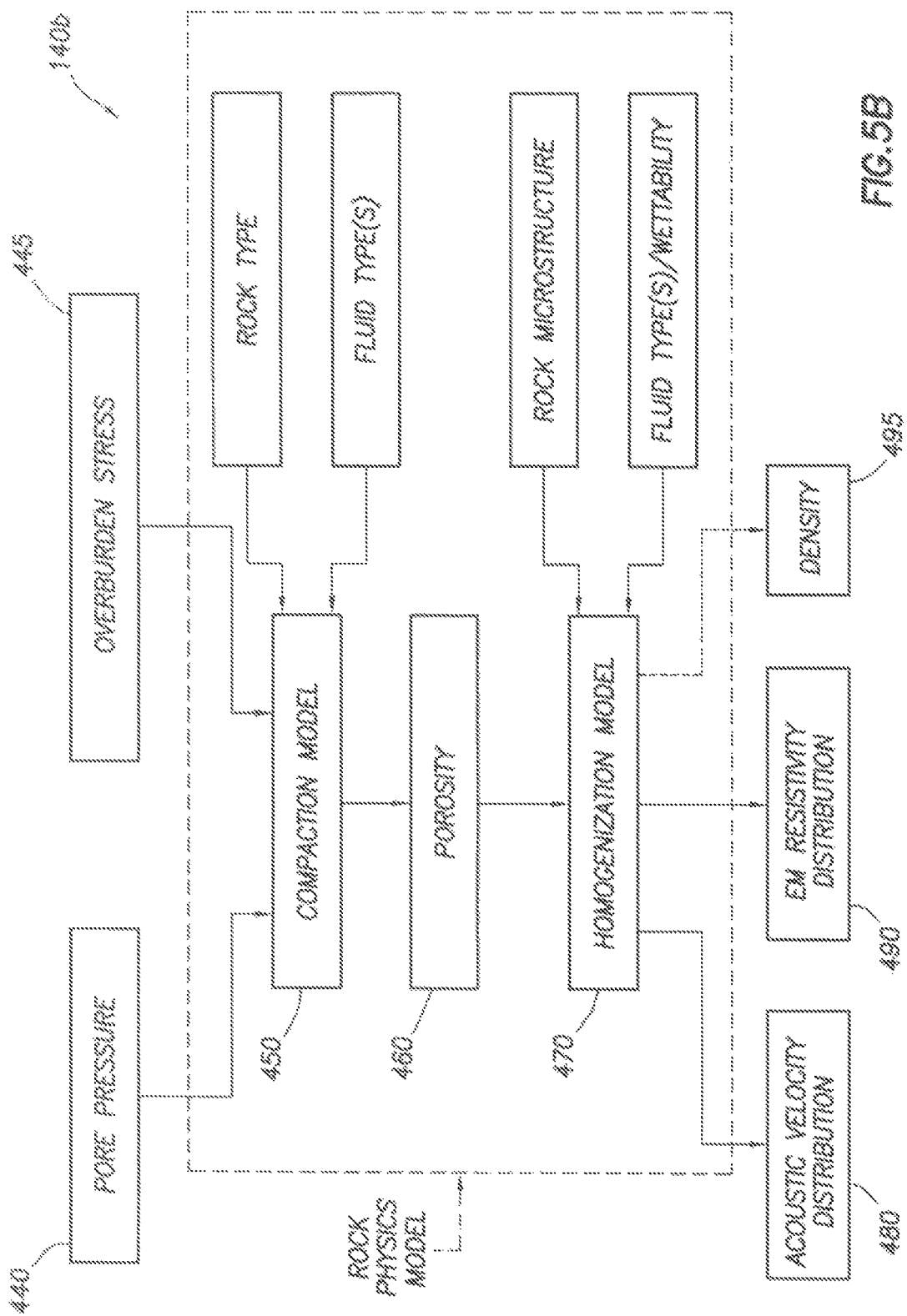
FIG. 5B is a representative flow diagram a representative flow diagram of another example method to provide a rock physics model.

FIGS. 5A and 5B are representative flow diagrams of example methods to provide the rock physics model at block 140 of the example method 50 in FIG. 2. The example method 140a in FIG. 5A is an empirical method for building a rock physics model for a subsurface layer such as, for example, any of the subsurface layers or regions 19a-d in FIG. 1. Each subsurface layer 19a-d may have a different rock physics model. At block 400, either the well being drilled or an existing offset well may be used or an offset well may be drilled. As an option at block 405, gamma ray measurements may be obtained for the subsurface layers of the offset well, and lithology is correlated between the offset well and the new well being drilled. To accomplish pore pressure prediction for the subsurface layers (e.g., subsurface layers or regions 19a-d of FIG. 1) of the new well being drilled, the gamma ray and/or other log measurements may be used to select the correct rock physics model or models.

At block 410, the overburden stress of the new well may be estimated from bulk density measurements made during drilling by the LWD tool 18 or after drilling by wireline tools. An example LWD tool 18 is an EcoScope tool provided by Schlumberger Oilfield Services, and an example wireline tool to measure the density of a subsurface layer is a TLD (Three Detector Lithology Density) tool also provided by Schlumberger Oilfield Services. Alternatively, data having a relationship or equivalence to overburden stress may be utilized at block 410.

At block 415, the pore pressure for subsurface layers of the new well may be determined during drilling by the LWD tool 18 or after drilling by wireline tools. An example LWD tool 18 is a formation or subsurface layer pressure tester named StethoScope, and an example wireline tool to measure real-time subsurface layer pressure is a Modular Formation Dynamics Tester (MDT), both provided by Schlumberger Oilfield Services.

The acoustic velocity for a subsurface layer of the new well may be determined during drilling by the LWD tool 18 or after drilling by wireline tools, (block 420). An example LWD tool 18 is a sonic-while-drilling tool named sonicVISION, and an example wireline tool to measure in real-time the velocity of a subsurface layer is a Dipole Shear Sonic Imager (DSI), both provided by Schlumberger Oilfield Services.

At 425, the resistivity for a subsurface layer of the new well may be determined during drilling by the LWD tool 18 or after drilling by wireline tools. An example LWD tool 18 to provide resistivity measurements is an Array Resistivity Compensated tool named arcVISION provided by Schlumberger Oilfield Services. An example wireline tool is an Rt Scanner (Resistivity Scanner) tool also provided by Schlumberger Oilfield Services.

An optional measurement that may be utilized in a rock physics model is density, as shown at block 430. The density of subsurface layers of the new well may be measured during drilling by the LWD tool 18 or after drilling by wireline tools. An example LWD tool 18 to measure the density of a subsurface layer is the EcoScope tool provided by Schlumberger Oilfield Services.

The measurements and estimates of the example empirical method 140a are correlated to provide a rock physics model, (block 435). Thus, the example empirical method 140a in FIG. 5A may be used to provide the example rock physics model at block 140 of the example method 50 in FIG. 2.

Additionally, the example rock physics model 140 in FIG. 2 may be provided by another empirical method. A laboratory experiment may be conducted to analyze soil samples of the particular rock and fluid from the subsurface region being modeled. A triaxial tester may be used to vary the loads exerted upon a soil sample. The load applied to the soil sample may represent the pore pressure, and the total vertical load component or stress imposed may represent the overburden. At different load levels, the triaxial tester may be instrumented to measure the acoustic velocity and EM resistivity of the soil sample. Also, the porosity and the density of the soil sample may be measured. The data obtained from the laboratory experiment may be used to build the example rock physics model disclosed in block 140 of the example method 50 in FIG. 2.

The example method 140b in FIG. 5B uses simulation tools to build a rock physics model for a subsurface layer such as, for example, any of the subsurface layers or regions 19a-d in FIG. 1. Each subsurface layer 19a-d may have a different rock physics model. Pore pressure and overburden stress, at blocks 440 and 445, may be determined for subsurface layers such as, for example, the subsurface layers 19a-d in FIG. 1, by utilizing the appropriate tools and techniques described above. Alternatively, data having a relationship or equivalence to overburden stress may be utilized at block 445. The pore pressure and overburden stress are inputs to a compaction model or mechanical earth model known in the art, (block 450). The compaction model of block 450 may use parameters such as rock type (e.g., shale, sandstone, etc.) and fluid types (e.g., gas, water, oil, mixture, etc.). The output of the compaction model is porosity, (block 460). The porosity is the input to a homogenization model, which includes parameter inputs for rock microstructure, fluid types, and wettability (block 470). The homogenization model of block 470 includes known models to relate porosity and fluid type to acoustic velocity (e.g., Gassman model; Krief model) to produce the acoustic velocity output, (block 480). The homogenization model also includes a known model to relate porosity and the parameters of fluid type and wettability to resistivity (e.g., Archie equations) to produce the EM resistivity distribution, (block 490). Optionally at block 495, porosity may used to provide density via a known relationship.

The example method 140b in FIG. 5B may be used to build the rock physics model including the outputs of EM resistivity distribution and acoustic velocity distribution disclosed at block 140 of the example process 50 in FIG. 2.

Alternatively, the rock physics model of block 140 in FIG. 2 may be built by the use of the equations or relationships disclosed in the paper entitled Real-Time Pore-Pressure Evaluation From MWD/LWD Measurements and Drilling-Derived Formation Strength, J. C. Rasmus et al, SPE Drilling Engineering, December 1991, which is hereby incorporated in its entirely herein.

Figure 6:
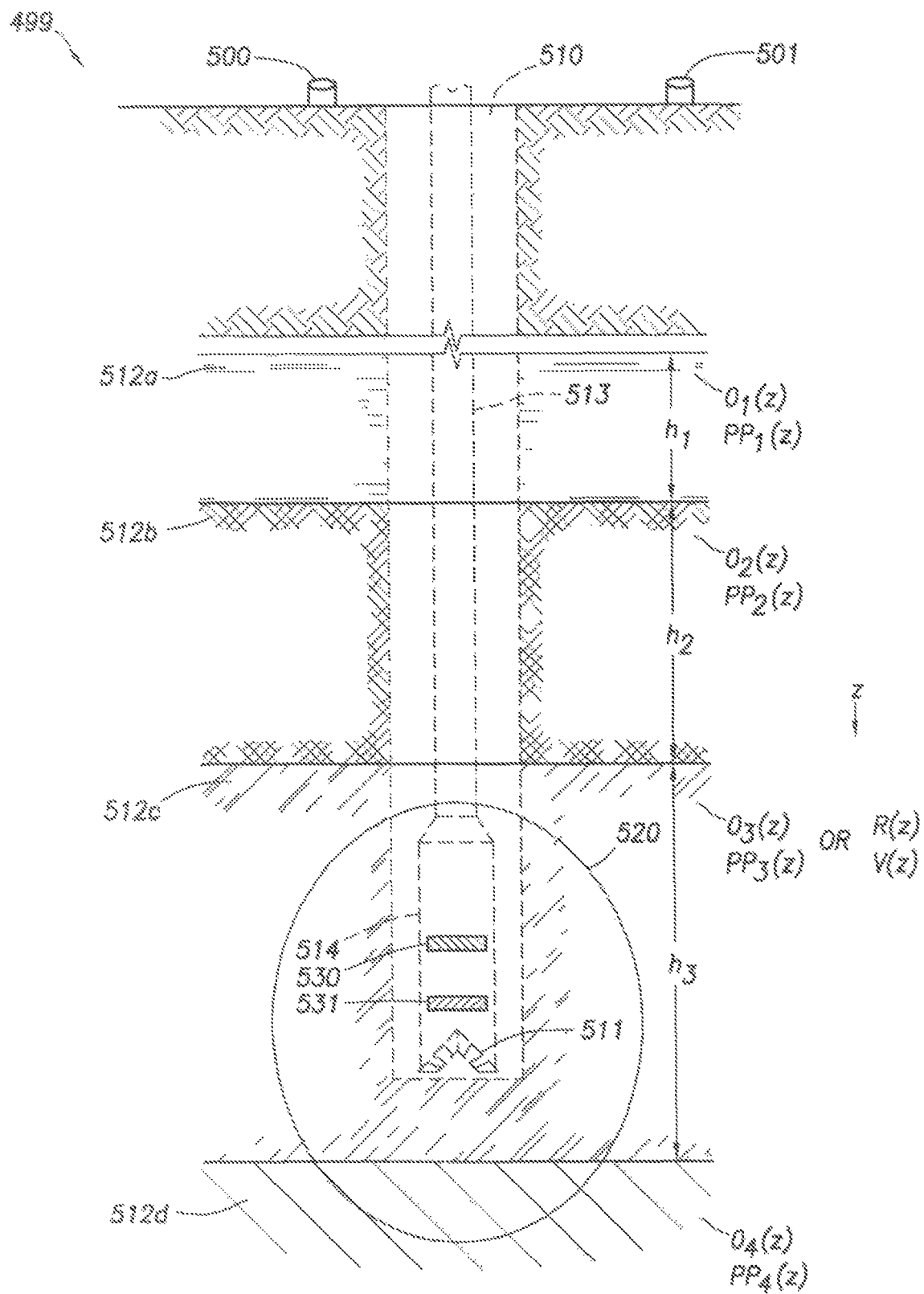
FIG. 6 is an illustration of an example earth formation model that may be used to predict pore pressure ahead of a drill bit.

FIG. 6 is an illustration of an example earth formation model 499 that may be used in the prediction of pore pressure ahead of the drill bit. The earth formation model 499 may be localized to describe only a portion 520 of the subsurface layers 512a-d or may include a description of subsurface layers 512a-d as shown in FIG. 6. Also, the model 499 may be two dimensional or three dimensional.

Referring to FIG. 6, the earth formation model 499 includes the subsurface layers 512a, 512b, 512c and 512d with the layers characterized by respective dimensions such as the thicknesses $h_1$, $h_2$ and $h_3$ that are each initially estimated and then progressively adjusted in the inversion processing of block 150 of FIG. 2. Each layer 512a-d may also be characterized by a respective overburden distribution $O_1(z)$, $O_2(Z)$, $O_3(Z)$, and $O_4(Z)$ that is initially estimated as shown in block 130 of FIG. 2. Each layer 512a-d may be characterized by a respective pore pressure distribution $PP_1(z)$, $PP_2(z)$, $PP_3(z)$, and $PP_4(z)$ and progressively adjusted in the inversion processing of block 150 of FIG. 2. The pore pressure distribution is preferably continuous in each subsurface layer, but may be discontinuous across subsurface layer boundaries or interfaces. In some cases, the pore pressure distribution is a linear function of depth such as, for example, when the subsurface layer is suspected to be permeable. In the case of an impermeable layer, for example the layer 512c, it may be advantageous to characterize the impermeable layer by a resistivity distribution, $R(Z)$, and a velocity distribution, $V(Z)$, instead of by a pore pressure and an overburden stress.

The earth formation model 499 illustrates horizontal layers of constant thickness but may be characterized by dip layers of varying thickness. Also, the distribution of the pore pressure and the overburden is shown to be dependent only on the depth Z, but the distributions may be dependent upon other parameters.

If necessary, a borehole 510, which is filled by drilling mud, may be part of the earth formation model 499. The borehole 510 may be a vertical borehole as illustrated but may include other non-vertical orientations.

The earth formation model 499 includes one or more sources 500 and receivers 501, one or more downhole actuators or sources 530, one or more downhole sensors or receivers 531, which are modeled to provide the required level of accuracy. The receiver 531 may be located between the source 530 and the drill bit 511. Alternatively, the source 530 may be located between the receiver 531 and the drill bit 511 (not shown).

Typically, the earth formation model 499 is used with one or more rock physics models (e.g., each subsurface layer may have a different rock physics model) to predict, for example, acoustic velocity data. For example, a downhole hydrophone receiver 531 may record acoustic wave data from an acoustic wave produced by the firing of a surface seismic source 500. Alternatively, the earth formation model 499 can be used to predict the EM resistivity data sensed by one or more downhole receiving coils 531, as a result of current flow in the transmitter coils of a source 530. Additionally, an earth formation model having a particular subsurface layer configuration may be used with more than one receiver 531 placed in different positions in the BHA to model EM resistivity distribution or acoustic velocity distribution at different stages of drilling the well bore 510.

Figure 7A:
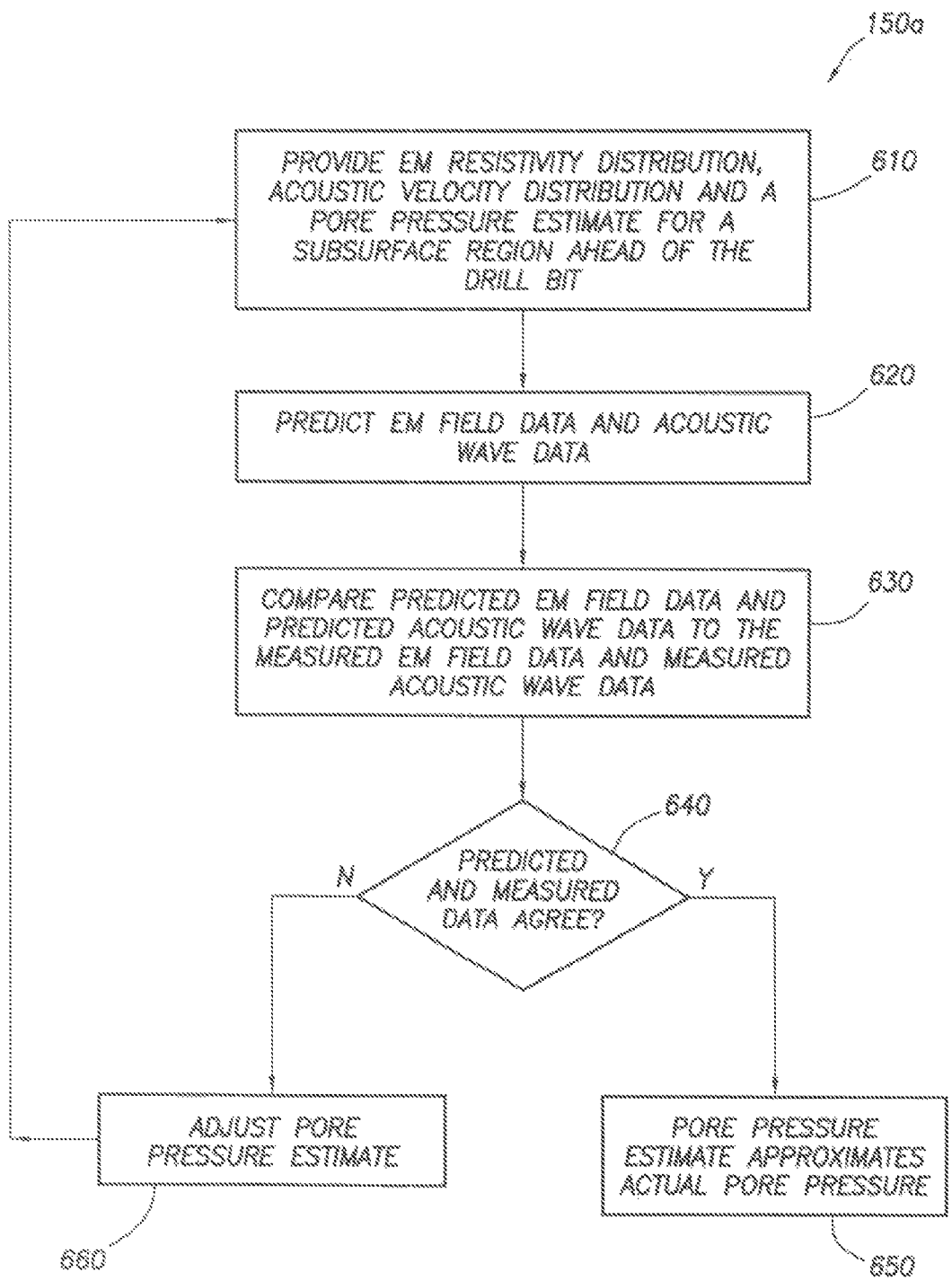
FIG. 7A is a representative flow diagram of an example inversion processing method to predict pore pressure ahead of a drill bit.
Figure 7B:
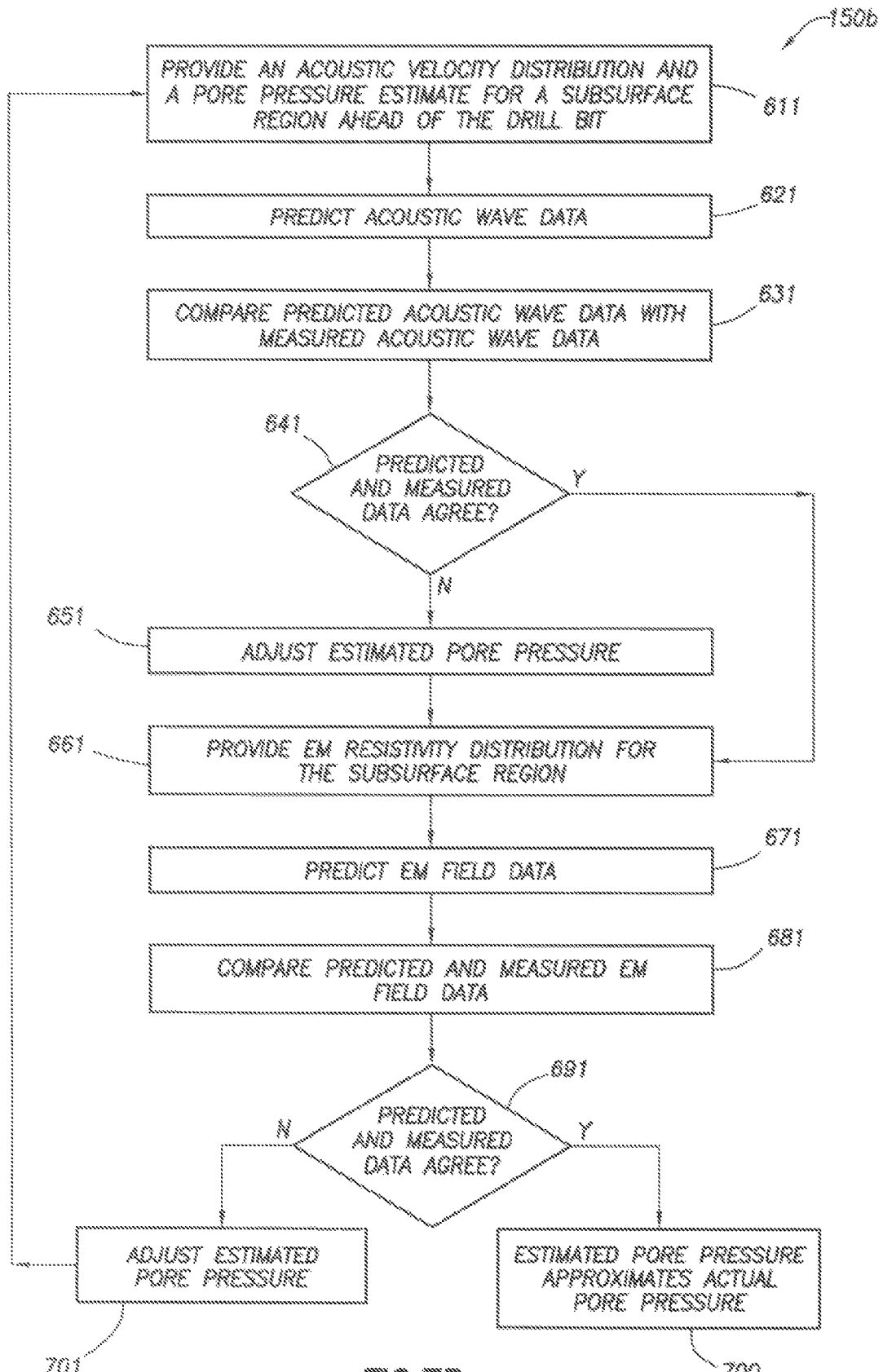
FIG. 7B is a representative flow diagram of another example inversion processing method to predict pore pressure ahead of a drill bit.

FIGS. 7A and 7B are representative flow diagrams of example inversion processing methods to compute the pore pressure ahead of the drill bit as disclosed in block 150 of the example method 50 in FIG. 2. The example inversion processing method 150a in FIG. 7A is an iterative coupled inversion processing method that simultaneously compares the predicted EM field data and the predicted acoustic wave data to the measured EM field data and the measured acoustic wave data to compute a pore pressure for a subsurface layer or region ahead of the drill bit such as, for example, the subsurface region 19d in FIG. 1.

Referring to FIG. 7A, at block 610 the example inversion processing method 150a includes obtaining an EM resisitvity distribution, an acoustic velocity distribution, and a pore pressure estimate for a subsurface region ahead of the drill bit. The parameters of EM resistivity distribution, acoustic velocity distribution, and a pore pressure estimate may be obtained from a rock physics model such as, for example, one of the rock physics models disclosed herein and/or in FIGS. 2, 5A, and 5B and may include data from an offset well or other prior data from the subsurface layers or regions. At block 620, by using forward modeling techniques well known in the art, the EM resistivity distribution and the acoustic velocity distribution are used to predict EM field data and acoustic wave data for the subsurface region. As previously disclosed herein for block 150 of FIG. 2, the predicted EM field data and the predicted acoustic wave data are compared to the measured EM field data and the measured acoustic wave data, (block 630). The comparison may be accomplished by solving field differential equations or by using tomography techniques. If the predicted and measured data agree (block 640), then the pore pressure estimate approximates the actual pore pressure at the subsurface region 19d ahead of the drill bit 11, (block 650). If the predicted and measured data do not agree (block 640), then the pore pressure estimate is adjusted (block 660) and used to recalculate the predicted EM field data and the predicted acoustic wave data. The example inversion processing method 150a in FIG. 7A is then repeated until the predicted acoustic wave data and the predicted EM field data substantially equal the respective measured acoustic wave data and the measured EM field data.

Alternatively as disclosed above for block 150 in FIG. 2, the example inversion processing method 150a in FIG. 7A may be an iterative inversion processing method that compares just one of the predicted EM field data or the predicted acoustic wave data to the respective measured EM field data or the measured acoustic wave data to compute a pore pressure for a subsurface layer or region ahead of the drill bit such as, for example, the subsurface region 19d in FIG. 1. Thus, the example inversion processing method 150a in FIG. 7A may also be a singular iterative inversion processing method to compute a pore pressure for a subsurface layer or region ahead of the drill bit.

The example inversion processing method 150b in FIG. 7B is an iterative sequential inversion processing method that sequentially compares the predicted acoustic wave data and the predicted EM field data to the measured acoustic wave data and the measured EM field data to compute a pore pressure for a subsurface layer or region ahead of the drill bit such as, for example, the subsurface region 19d in FIG. 1.

Referring to FIG. 7B, at block 611 the example inversion processing method 150b includes obtaining an acoustic velocity distribution and a pore pressure estimate for a subsurface region ahead of the drill bit. The acoustic velocity distribution and pore pressure estimate may be obtained from a rock physics model such as, for example, one of the rock physics models disclosed herein and/or in FIGS. 2, 5A, and 5B and may include data from an offset well or other prior data from the subsurface layers or regions.

At block 621, by using forward modeling techniques well known in the art the acoustic velocity distribution is used to predict acoustic wave data for the subsurface region. As previously disclosed herein for block 150 of FIG. 2, the predicted acoustic wave data are then compared to the measured acoustic wave data, (block 631). The comparison may be accomplished by solving field differential equations or by using tomography techniques. If the predicted and measured data agree (block 641), the example inversion processing method 150b proceeds to block 661 wherein an EM resistivity distribution is obtained. The EM resistivity distribution may be obtained from a rock physics model such as, for example, one of the rock physics models disclosed herein and/or in FIGS. 2, 5A, and 5B and may include data from an offset well or other prior data from the subsurface layers or regions. If the predicted and measured data do not agree (block 641), the example inversion processing method 150b proceeds to block 651 wherein the pore pressure estimate is adjusted before the method 150b proceeds to block 661.

At block 671, by using forward modeling techniques well known in the art the EM resistivity distribution is used to predict EM field data for the subsurface region. As previously disclosed herein for block 150 of FIG. 2, the predicted EM field data are compared to the measured EM field data, (block 681). The comparison may be accomplished by solving field differential equations or by using tomography techniques If the predicted and measured data agree (block 691), then the estimated pore pressure approximates the actual pore pressure at the subsurface region 19d ahead of the drill bit 11, (block 700). If the predicted and measured data do not agree (block 691), then the estimated pore pressure is adjusted (block 701) and used to recalculate the predicted acoustic wave data. The example inversion processing method 150b in FIG. 7B is then repeated until the predicted acoustic wave data and the predicted EM field data substantially equal the respective measured acoustic wave data and the measured EM field data.

From the foregoing, persons of ordinary skill in the art will appreciate that other methods of implementing the example methods may alternatively used. For example, the order of execution of the blocks may be changed, and/or some of the blocks described may be changed, eliminated, or combined.

Although certain example apparatus and methods have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to compute a pore pressure of a subsurface region, comprising:
   measuring electromagnetic (EM) field data related to EM resistivity at the subsurface region by actuating at least one EM transmitter disposed on at least one of the Earth's surface and on a tool in the subsurface region, and detecting response of the subsurface region using at least one EM receiver disposed in the subsurface region if the EM transmitter is disposed at the Earth's surface or disposed at the Earth's surface if the EM transmitter is disposed on the tool in the subsurface region;
   measuring acoustic wave data related to acoustic velocity at the subsurface region by actuating at least one acoustic transmitter disposed at least one of the Earth's surface and in the subsurface region and detecting acoustic energy with at least one acoustic receiver disposed at least one of a tool in the subsurface region if the acoustic transmitter is disposed at the Earth's surface or at the Earth's surface if the acoustic transmitter is disposed in the subsurface region;
   providing a rock physics model characteristic of the subsurface region, wherein the rock physics model comprises a correlation between EM resistivity field data, acoustic wave velocity data, and a pore pressure estimate for the subsurface region, to provide an EM resistivity distribution and an acoustic velocity distribution at the subsurface region; and
   computing the pore pressure of the subsurface region by adjusting the EM resistivity distribution and the acoustic velocity distribution to the measured EM field data and the measured acoustic wave data.

2. A method as defined in claim 1, wherein adjusting the EM resistivity distribution and the acoustic velocity distribution includes using the pore pressure estimate and forward modeling of the EM resistivity distribution and acoustic velocity distribution to predict EM field data and acoustic wave data; determining differences between the predicted EM field data and predicted acoustic wave data and the respective measured EM field data and measured acoustic wave data; adjusting the pore pressure estimate and repeating predicting EM field data and acoustic wave data until at least one of the predicted EM field data or the predicted acoustic wave data is substantially equal to the respective measured EM field data or the measured acoustic wave data.

3. A method as defined in claim 1, further including measuring density data related to density at the subsurface region and the rock physics model including the measured density data to provide a density distribution, and the computing includes adjusting the density distribution to the measured density data.

4. A method as defined in claim 1, wherein the rock physics model includes at least one of overburden stress at the subsurface region or data related to the overburden stress.

5. A method as defined in claim 1, wherein the rock physics model includes overburden stress obtained from density data.

6. A method as defined in claim 1, further including drilling a well bore into a subsurface of the earth with a drilling tool.

7. A method as defined in claim 6, wherein said subsurface region is ahead of the drilling tool.

8. A method as defined in claim 7, further including determining whether the computed pore pressure is greater than a pressure in the well bore.

9. A method as defined in claim 8, further including continuing drilling the well bore if the computed pore pressure is not greater than the pressure in the well bore.

10. A method as defined in claim 8, wherein determining includes detecting a flow of formation fluid into the well bore.

11. A method as defined in claim 8, further including shutting off the well bore if the computed pore pressure is greater than the pressure in the well bore.

12. A method as defined in claim 11, further including changing a fluid being circulated in the well bore to increase the pressure in the well bore.

13. A method as defined in claim 7, wherein measuring EM field data includes a magneto-telluric survey.

14. A method as defined in claim 7, wherein measuring EM field data includes using at least one EM source instrument to conduct an EM survey at a surface.

15. A method as defined in claim 14, wherein measured EM field data from the EM survey is used in inversion processing to provide distances between the EM source instrument and subsurface layers including the subsurface region and a resistivity profile of each subsurface layer.

16. A method as defined in claim 15, wherein the inversion processing includes using surface seismic survey data.

17. A method as defined in claim 16, wherein the inversion processing includes data from at least one of a surface gravimetric survey or an offset well.

18. A method as defined in claim 15, further including determining the position of the drilling tool.

19. A method as defined in claim 14, wherein the surface is proximate the bottom of a body of seawater.

20. A method as defined in claim 7, wherein measuring EM field data includes using at least one EM source instrument at a surface above the well bore and at least one EM receiver instrument proximate the drilling tool, and measuring the EM field data during drilling.

21. A method as defined in claim 7, wherein measuring EM field data includes using at least an EM source instrument proximate the drilling tool and at least one EM receiver instrument at an uphole surface, and measuring EM field data during drilling.

22. A method as defined in claim 7, wherein measuring EM field data includes using at least one EM source instrument and at least one EM receiver instrument both proximate the drilling tool, and measuring the EM field data during drilling.

23. A method as defined in claim 7, wherein measuring acoustic wave data includes using at least one seismic source instrument at more than one location to conduct a surface survey.

24. A method as defined in claim 23, wherein measured acoustic wave data from the survey is used in inversion processing to provide distances of subsurface layers including the subsurface region from the surface and a velocity profile of each layer.

25. A method as defined in claim 24, wherein the inversion processing includes data from at least one of a surface gravimetric survey, a surface EM survey or an offset well.

26. A method as defined in claim 25, further including determining the position of the drilling tool.

27. A method as defined in claim 23, further including at least a second seismic source instrument at another location to generate seismic waves from the more than one location.

28. A method as defined in claim 27, further including using at least one acoustic receiver proximate the drilling tool, generating seismic waves and determining travel times of the seismic waves reflected from the subsurface region ahead of the drilling tool, and inverting the travel times to provide a velocity of the subsurface region.

29. A method as defined in claim 23, further including using a plurality of acoustic receivers proximate the drilling tool, generating seismic waves and determining travel times of the seismic waves reflected from the subsurface region ahead of the drilling tool, and inverting the travel times to provide a velocity of the subsurface region.

30. A method as defined in claim 7, wherein measuring acoustic wave data includes providing at least one seismic source proximate the drilling tool and providing at least one receiver source at a surface above the well bore, generating seismic waves, determining travel times of the seismic waves reflected from subsurface layers including the subsurface region and inverting the travel times to provide velocities of the subsurface layers.

31. A method as defined in claim 7, wherein measuring acoustic wave data includes using at least one acoustic source and one acoustic receiver both proximate the drilling tool, generating acoustic waves and determining the acoustical impedance of the acoustic waves reflected from the subsurface region, and determining a velocity of the subsurface region.

32. A method as defined in claim 7, wherein creating an earth formation model includes drilling an offset well and for the offset well estimating overburden and determining pore pressure, acoustic velocity, and resistivity.

33. A method as defined in claim 32, further including determining radioactivity levels for subsurface layers including the subsurface region.

34. A method as defined in claim 32, further including determining density for subsurface layers including the subsurface region.

35. A method as defined in claim 7, wherein providing a rock physics model includes creating a model by correlating pore pressure and overburden stress at the subsurface region with rock type and at least one fluid type to determine porosity, and correlating porosity, rock microstructure, fluid type, and wettability of rock to provide at least one of acoustic velocity or resistivity.

36. A method to compute a pore pressure of a subsurface region, comprising:

measuring electromagnetic (EM) field data related to EM resistivity at the subsurface region by actuating at least one EM transmitter disposed on at least one of the Earth's surface and on a tool in the subsurface region, and detecting response of the subsurface region using at least one EM receiver disposed in the subsurface region if the EM transmitter is disposed at the Earth's surface or at the Earth's surface if the EM transmitter is disposed in the subsurface region;

providing a rock physics model characteristic of the subsurface region, wherein the rock physics model comprises a correlation between EM resistivity field data and a pore pressure estimate for the subsurface region, to provide an EM resistivity distribution at the subsurface region; and computing the pore pressure of the subsurface region by adjusting the EM resistivity distribution to the measured EM field data.

37. A method as defined in claim 36, wherein adjusting the EM resistivity distribution includes using the pore pressure estimate and forward modeling of the EM resistivity distribution to predict EM field data; determining differences between the predicted EM field data and the measured EM field data; adjusting the pore pressure estimate and repeating predicting EM field data until the predicted EM field data is substantially equal to the measured EM field data.

38. A method as defined in claim 36, wherein the rock physics model includes at least one of overburden stress at the subsurface region or data related to the overburden stress.

39. A method as defined in claim 36, wherein the rock physics model includes overburden stress obtained from density data.

* * * * *